United States Patent
Kim et al.

(10) Patent No.: US 10,834,570 B2
(45) Date of Patent: Nov. 10, 2020

(54) SERVICE REQUEST TRANSMISSION AND USER EQUIPMENT, AND SERVICE REQUEST RECEPTION AND BASE STATION

(71) Applicant: LG ELECTRONICS INC., Seoul (KR)

(72) Inventors: Taehun Kim, Seoul (KR); Jaehyun Kim, Seoul (KR); Sangmin Park, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/077,388

(22) PCT Filed: Feb. 17, 2017

(86) PCT No.: PCT/KR2017/001803
§ 371 (c)(1),
(2) Date: Aug. 10, 2018

(87) PCT Pub. No.: WO2017/142363
PCT Pub. Date: Aug. 24, 2017

(65) Prior Publication Data
US 2019/0053034 A1    Feb. 14, 2019

Related U.S. Application Data

(60) Provisional application No. 62/321,693, filed on Apr. 12, 2016, provisional application No. 62/300,083,
(Continued)

(51) Int. Cl.
*H04W 4/00* (2018.01)
*H04W 8/08* (2009.01)
(Continued)

(52) U.S. Cl.
CPC ......... *H04W 8/08* (2013.01); *H04W 36/0022* (2013.01); *H04W 76/10* (2018.02);
(Continued)

(58) Field of Classification Search
CPC ... H04W 8/08; H04W 36/0022; H04W 76/18; H04W 76/12; H04W 76/30; H04W 76/27; H04W 76/11
(Continued)

(56) References Cited

U.S. PATENT DOCUMENTS

| 2010/0278142 A1 | 11/2010 | Dwyer et al. |
| 2012/0196599 A1 | 8/2012 | Cho et al. |

(Continued)

FOREIGN PATENT DOCUMENTS

WO    2013109064    7/2013

OTHER PUBLICATIONS

PCT International Application No. PCT/KR2017/001803, Written Opinion of the International Searching Authority dated May 26, 2017, 21 pages.
(Continued)

*Primary Examiner* — Mang Hang Yeung
(74) *Attorney, Agent, or Firm* — Lee Hong Degerman King Waimey

(57) ABSTRACT

A user equipment can send an EPS mobility management (EMM) message including uplink data to a network node. The user equipment can determine that an EMM process complying with the EMM message has successfully been completed or can treat an EMM process complying with the EMM message as having been successfully completed if the user equipment receives an RRC disconnection, downlink data or service acceptance message for the EMM message.

18 Claims, 11 Drawing Sheets

Related U.S. Application Data filed on Feb. 26, 2016, provisional application No. 62/299,010, filed on Feb. 24, 2016, provisional application No. 62/297,772, filed on Feb. 19, 2016.

(51) Int. Cl.

| | | |
|---|---|---|
| *H04W 76/27* | (2018.01) | |
| *H04W 76/30* | (2018.01) | |
| *H04W 76/11* | (2018.01) | |
| *H04W 36/00* | (2009.01) | |
| *H04W 76/12* | (2018.01) | |
| *H04W 76/18* | (2018.01) | |
| *H04W 76/10* | (2018.01) | |
| *H04W 4/70* | (2018.01) | |
| *H04L 29/08* | (2006.01) | |

(52) U.S. Cl.
CPC ............ *H04W 76/11* (2018.02); *H04W 76/12* (2018.02); *H04W 76/18* (2018.02); *H04W 76/27* (2018.02); *H04W 76/30* (2018.02); *H04L 67/12* (2013.01); *H04W 4/70* (2018.02)

(58) Field of Classification Search
USPC ........................................................ 370/329
See application file for complete search history.

(56) References Cited

U.S. PATENT DOCUMENTS

| | | | | |
|---|---|---|---|---|
| 2015/0245402 | A1* | 8/2015 | Mochizuki | ............ H04W 76/15 |
| | | | | 370/331 |
| 2017/0086062 | A1* | 3/2017 | Chen | ...................... H04L 69/325 |
| 2018/0295556 | A1* | 10/2018 | Baek | ...................... H04W 8/20 |

OTHER PUBLICATIONS

Alcatel-Lucent, et al., "Introduction of Control Plane CIoT EPS optimization", 3GPP TSG SA WG2 Meeting #112, S2-160909, Jan. 2016, 29 pages.
SA2, "Response to LS on questions on CIoT", 3GPP TSG RAN WG1 Meeting #84, R1-160842, Feb. 2016, 7 pages.
European Patent Office Application Serial No. 17753524.2, Search Report dated Sep. 13, 2019, 12 pages.
Alcatel-Lucent, et al., "Data transfer using Control Plane CIoT EPS optimization—Alt2 ESR", 3GPP TSG-CT WG1 Meeting #96, C1-161427, XP051049776, Feb. 2016, 20 pages.
Alcatel-Lucent, et al., "Service request handling for the UE attached for Control Plane CIoT", 3GPP TSG-CT WG1 Meeting #96, C1-161257, XP051049763, Feb. 2016, 10 pages.
Vodafone, et al., "CIoT Data via MME transport procedure", 3GPP TSG-CT WG1 Meeting #96, C1-161192, XP051050260, Feb. 2016, 10 pages.
Intel, et al., "CIoT Updates to Service Request Procedure for Transfer of Data via MME", 3GPP TSG-CT WG1 Meeting #97, C1-161939, XP051078784, Apr. 2016, 14 pages.
Intel, et al., "CIoT Updates to Service Request Procedure for Transfer of Data via MME", 3GPP TSG-CT WG1 Meeting #97, C1-162166, XP051090704, Apr. 2016, 22 pages.

\* cited by examiner (a) UE-P-GW user plane with E-UTRAN (b) Control Plane UE-MME

SERVICE REQUEST TRANSMISSION AND USER EQUIPMENT, AND SERVICE REQUEST RECEPTION AND BASE STATION

CROSS-REFERENCE TO RELATED APPLICATIONS

This application is the National Stage filing under 35 U.S.C. 371 of International Application No. PCT/KR2017/001803, filed on Feb. 17, 2017, which claims the benefit of U.S. Provisional Application Nos. 62/297,772, filed on Feb. 19, 2016, 62/299,010, filed on Feb. 24, 2016, 62/300,083, filed on Feb. 26, 2016 and 62/321,693, filed on Apr. 12, 2016, the contents of which are all hereby incorporated by reference herein in their entirety.

TECHNICAL FIELD

The present invention relates to a wireless communication system, and more particularly, to methods and devices for transmitting/receiving service requests.

BACKGROUND ART

Wireless communication systems have been widely deployed to provide various types of communication services such as voice or data. In general, the wireless communication system corresponds to a multiple access system capable of supporting communication between multiple users by sharing available system resources (e.g., bandwidth, transmission power, etc.). For example, the multiple access system includes a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With the development of smart devices, a new method for efficiently transmitting/receiving a small amount of data or infrequently occurring data is required.

The technical objects that can be achieved through the present invention are not limited to what has been particularly described hereinabove and other technical objects not described herein will be more clearly understood by persons skilled in the art from the following detailed description.

Technical Solution

A user equipment (UE) can transmit an EPS mobility management (EMM) message including uplink data to a network node. When the UE receives an RRC connection release indication, downlink data, or a SERVICE ACCEPT message in response to the EMM message, the UE may consider or treat that an EMM procedure in accordance with the EMM message is successfully completed.

In an aspect of the present invention, provided is a method for transmitting a service request by a user equipment (UE). The method may include: transmitting a SERVICE REQUEST message including uplink user data; and when a radio resource control (RRC) connection release indication or downlink data is received, considering that a service request procedure in accordance with the SERVICE REQUEST message is successfully completed. The SERVICE REQUEST message may be a non-access stratum (NAS) message. While the UE is using Control Plane CIoT optimization where user data is transported via a control plane, if the UE receives the RRC connection release indication or the downlink data, the UE may consider that the service request procedure in accordance with the service request message is successfully completed.

In another aspect of the present invention, provided is a method for receiving a service request by a network node. The method may include: receiving a SERVICE REQUEST message including uplink data from a user equipment (UE); and completing a service request procedure in accordance with the SERVICE REQUEST message by transmitting a radio resource control (RRC) connection release indication or downlink data to the UE. The SERVICE REQUEST message may be a non-access stratum (NAS) message. While the UE is using Control Plane CIoT optimization where user data is transported via a control plane, the network node may indicate that a service request procedure in accordance with the SERVICE REQUEST message is successfully completed by transmitting the RRC connection release indication or downlink data.

In still another aspect of the present invention, provided is a user equipment (UE) for transmitting a service request. The UE may include a transmitting/receiving (Tx/Rx) module and a processor configured to control the Tx/Rx module. The processor may be configured to: control the Tx/Rx module to transmit a SERVICE REQUEST message including uplink data; and when a radio resource control (RRC) connection release indication or downlink data is received, consider that a service request procedure in accordance with the SERVICE REQUEST message is successfully completed. The SERVICE REQUEST message may be a non-access stratum (NAS) message. While the UE is using Control Plane CIoT optimization where user data is transported via a control plane, if the RRC connection release indication or the downlink data is received, the processor may be configured to consider that the service request procedure in accordance with the service request message is successfully completed.

In a further aspect of the present invention, provided is a network node for receiving a service request. The network node may include a transmitting/receiving (Tx/Rx) module and a processor configured to control the Tx/Rx module. The processor may be configured to: control the Tx/Rx module to receive a SERVICE REQUEST message including uplink data from a user equipment (UE); and control the Tx/Rx module to transmit a radio resource control (RRC) connection release indication or downlink data to the UE in order to complete a service request procedure in accordance with the SERVICE REQUEST message. The SERVICE REQUEST message may be a non-access stratum (NAS) message. While the UE is using Control Plane CIoT optimization where user data is transported via a control plane, if the RRC connection release indication or the downlink data is received, the processor may be configured to inform the UE that a service request procedure in accordance with the SERVICE REQUEST message is successfully completed by controlling the Tx/Rx module to transmit the RRC connection release indication or downlink data.

In each aspect of the present invention, when the UE receives the RRC connection release indication, the downlink data, or a SERVICE ACCEPT message, the UE may consider that the service request procedure is successfully completed.

In each aspect of the present invention, the network node may be configured to control the Tx/Rx module to transmit the RRC connection release indication, the downlink data, or the SERVICE ACCEPT message to the UE in order to complete the service request procedure in accordance with the service request message.

In each aspect of the present invention, when transmitting the SERVICE REQUEST message, the UE may start a specific timer. In addition, when receiving the RRC connection release indication, the downlink data, or the SERVICE ACCEPT message before expiration of the specific timer, the UE may consider that the service request procedure is successfully completed.

In each aspect of the present invention, the downlink data may be transmitted or received via the control plane.

In each aspect of the present invention, the network node may be a mobility management entity (MME).

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to the present invention, it is possible to implement a low-complexity/low-cost UE.

According to the present invention, a UE can communicate with the network in narrowband.

According to an embodiment of the present invention, a small amount of data can be efficiently transmitted/received.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
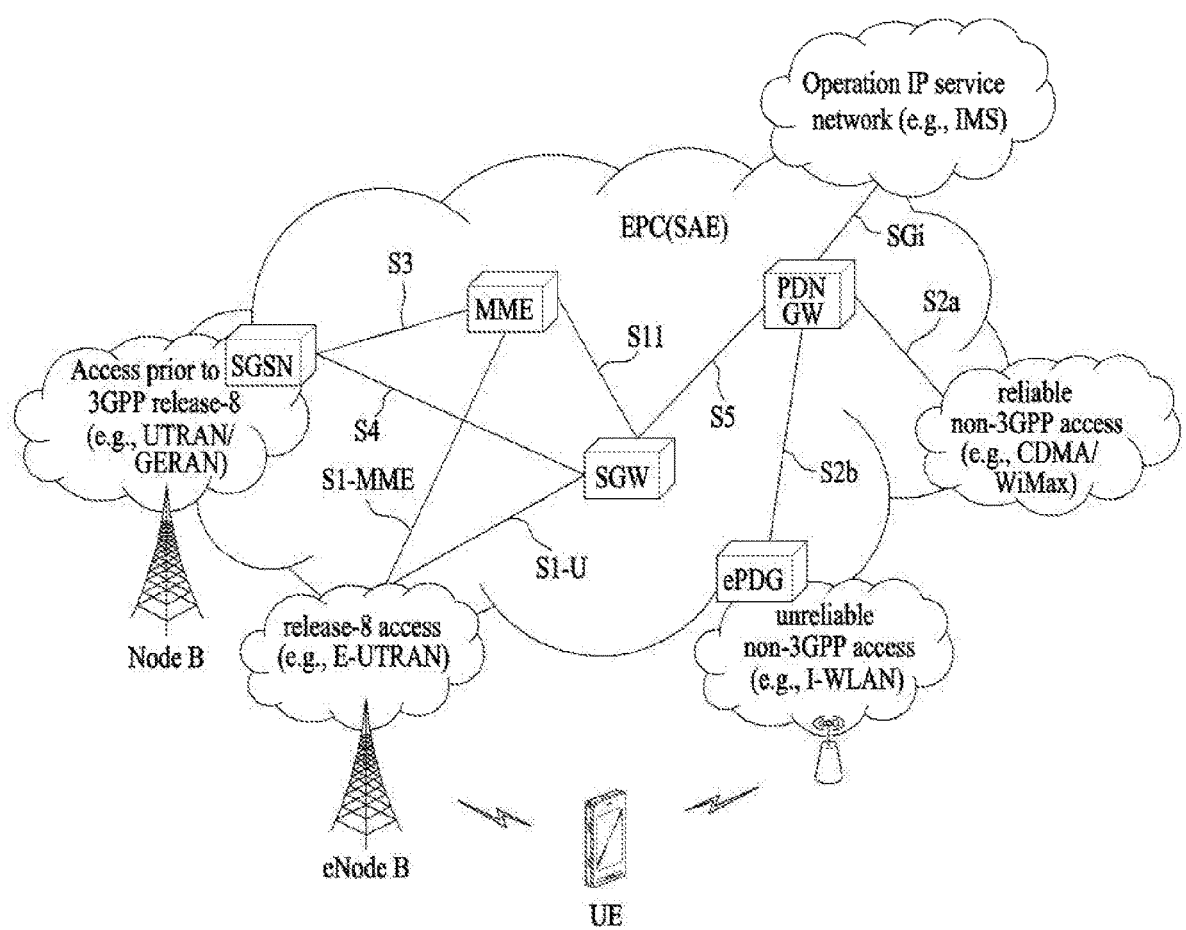
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an S1 signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
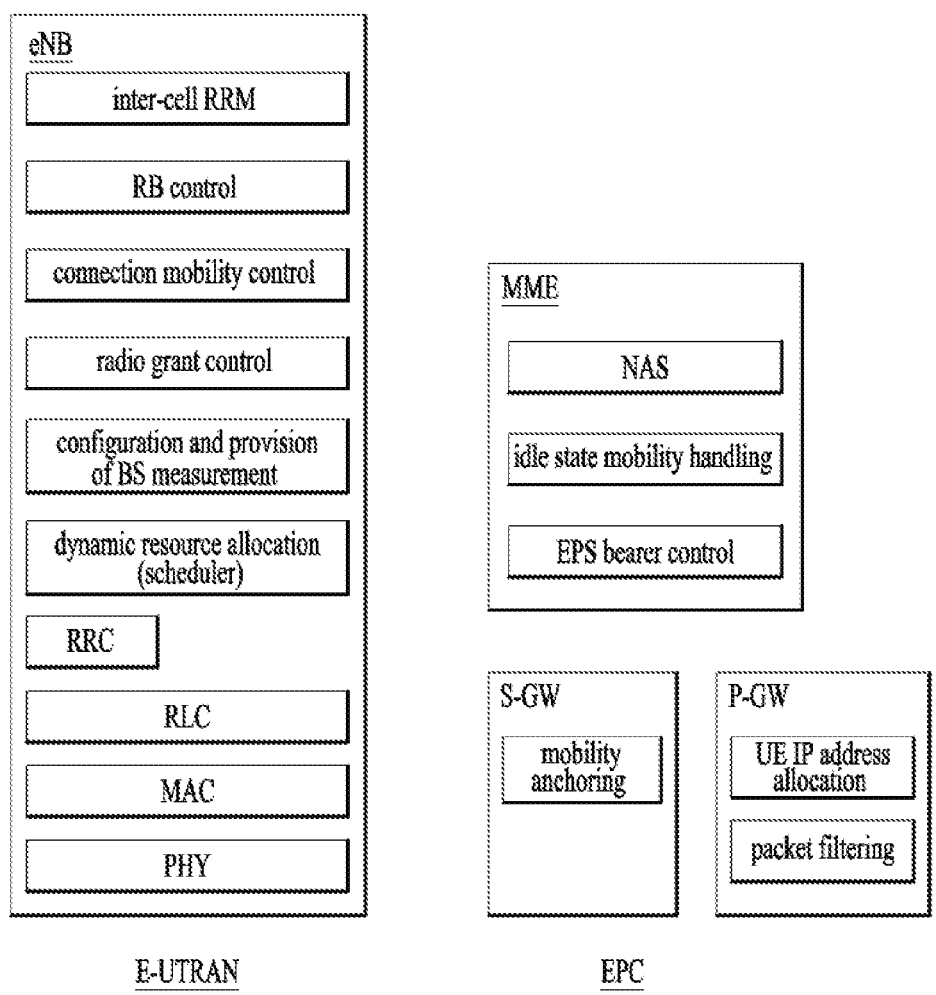
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
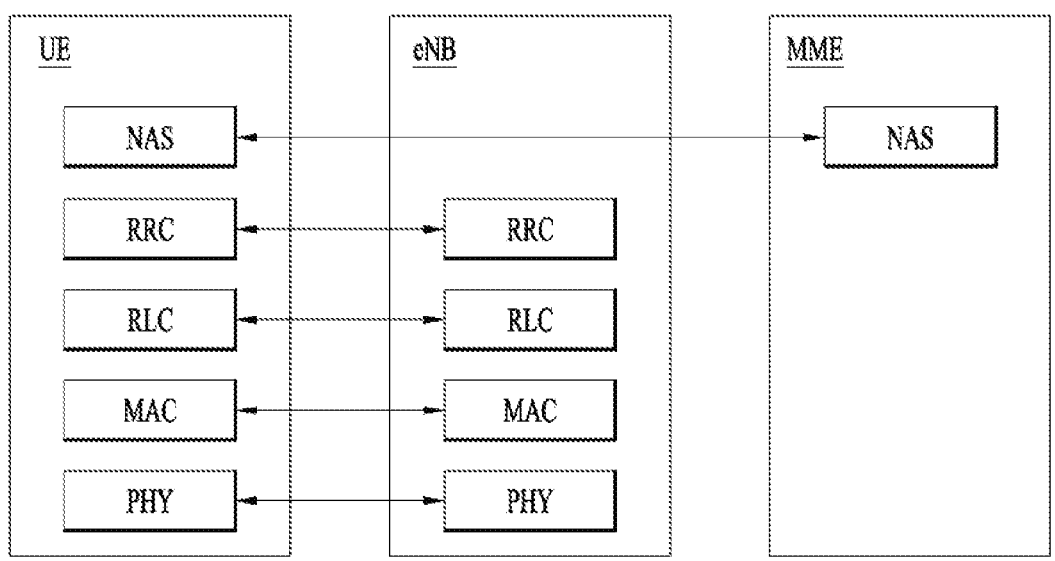
FIG. 3 is a diagram exemplarily illustrating the structure of a radio interface protocol in a control plane.
Figure 4:
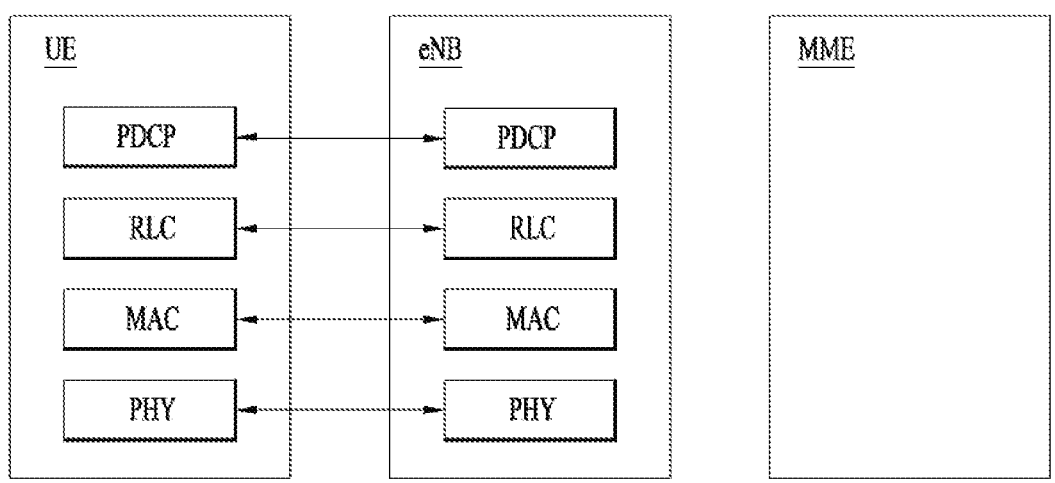
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The NAS forms the highest stratum of the control plane between a UE and an MME. The main functions of the protocols that are part of the NAS are to support mobility of the UE and session management procedures for establishing and maintaining IP connectivity between the UE and a P-GW. The NAS security is an additional function of the NAS that provides services to the NAS protocols, for example, integrity protection and ciphering of NAS signaling messages. To support these functions, elementary procedures for EPS mobility management (EMM) and elementary procedures for EPS session management (ESM) are supplied. Further, complete NAS transactions consist of specific sequences of elementary procedures.

Hereinafter, the procedures used for mobility management for EPS services at the radio interface will be described. The main function of a mobility management sublayer is to support the mobility of the UE such as informing the network of its current location and providing user identity confidentiality. Another function of the mobility management sublayer is to provide connection management services to a session management (SM) sublayer and a short message services (SMS) entity of a connection management (CM) sublayer. All EMM procedures can be performed only when a NAS signaling connection has been established between the UE and network. Otherwise, the EMM sublayer initiates the establishment of the NAS signaling connection. Depending on how the EMM procedures can be initiated, the EMM procedures can be classified into the following three types: EMM common procedures; EMM specific procedures; and EMM connection management procedures (S1 mode only). The EMM common procedures can always be initiated while the NAS signaling connection exists. In the case of the EMM specific procedures, only one UE initiated EMM specific procedure can be running at any time. The EMM specific procedures include attach, detach, tracking area update, etc. The EMM connection management procedures include service request, paging request, transport of NAS messages, and generic transport of NAS messages.

The ESM (EPS Session Management) belonging to the NAS layer performs functions such as default bearer management and dedicated bearer management to control a UE to use a PS service from a network. In other words, the main function of an ESM sublayer is to support EPS bearer context handling in the UE and MME. The ESM includes a procedure(s) for the activation, deactivation and modification of EPS bearer contexts and a procedure(s) for the request for resources (IP connectivity to a PDN or dedicated bearer resources) by the UE. In addition, when a UE establishes the initial connection to a specific packet data network (PDN) to access to the network, the default EPS bearer resource may be allocated by the network. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR. A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

The details of the EMM and ESM procedures could be found in 3GPP TS 24.301.

Figure 5:
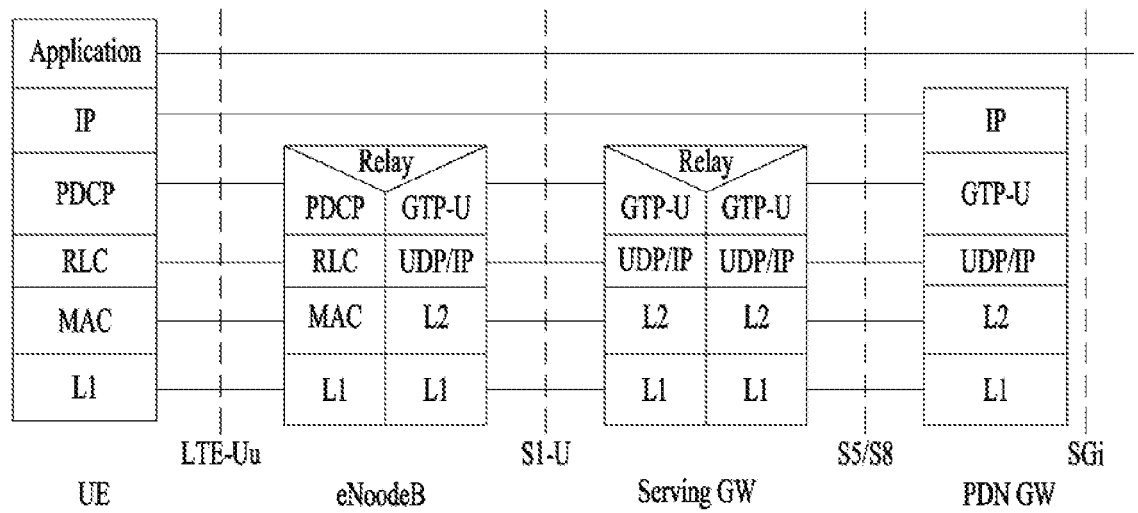
FIG. 5 is a diagram illustrating LTE (Long Term Evolution) protocol stacks for a user plane and a control plane.
Figure 5:
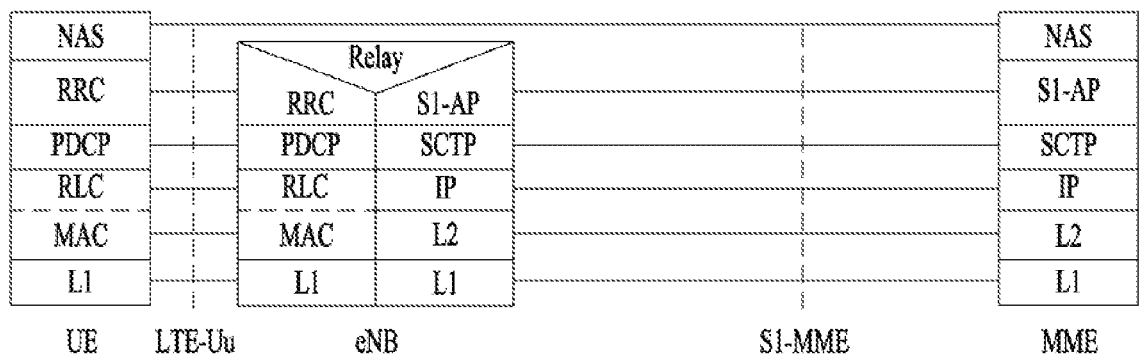

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
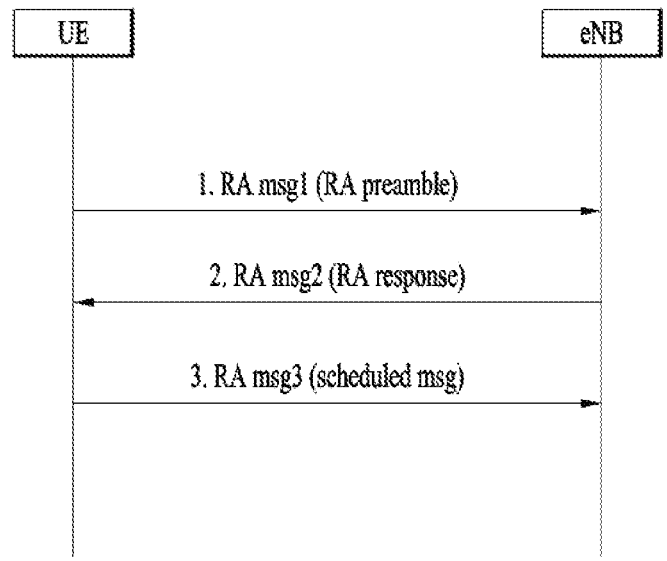
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

>1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

>2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

>3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
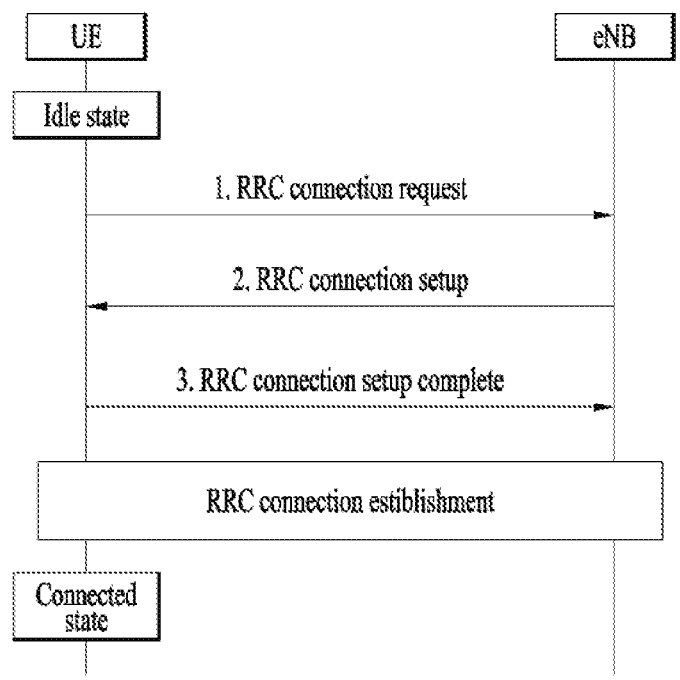
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

>1. When the UE in the idle state desires to establish RRC connection for reasons such as an attempt to make a call, a data transmission attempt, or a response of the eNB to paging, the UE transmits an RRC connection request message to the eNB first.

>2. Upon receiving the RRC connection request message from the UE, the eNB accepts the RRC connection request of the UE when the radio resources are sufficient, and then transmits an RRC connection setup message, which is a response message, to the UE.

>3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support 'IoT' devices characterized as ultra-low complexity, power limitation and low data rates.

In the prior art, a connection with the network should be established for transmitting data to a UE in EMM-Idle mode. To this end, the UE should successfully complete the service request procedure illustrated in FIG. 8, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

The Control Plane CIoT EPS optimization is signaling optimization capable of efficient transport of user data (IP or non-IP or SMS) on the control plane. In the case of a Control Plane CIoT EPS optimization solution, there is no setup data radio bearer, but data packets are transmitted When a UE and MME use the Control Plane CIoT EPS optimization, the UE and MME may transfer IP or non-IP data through NAS signaling depending on data types selected for a PDN connection supported at PDN connection establishment. The Control Plane CIoT EPS optimization can be achieved by using NAS transport capabilities of RRC and S1-AP protocols and data transfer through GTP (Evolved General Packet Radio Service (GPRS) Tunneling Protocol) tunnels between an MME and an S-GW and between an S-GW and a P-GW.

Figure 8:
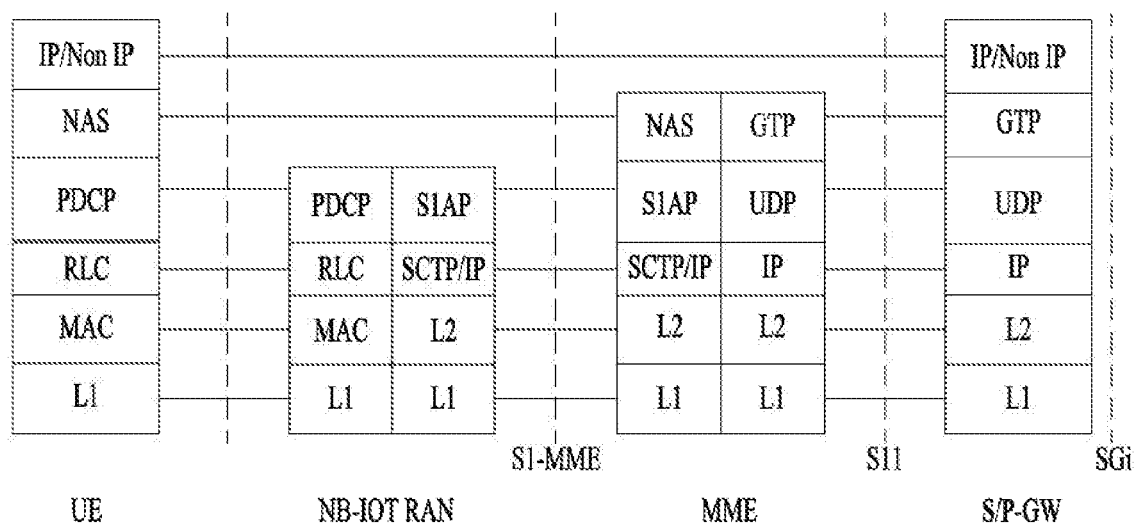
FIG. 8 illustrates user plane protocol stacks between a UE and a P-GW in accordance with the Control Plane CIoT EPS optimization.

FIG. 8 illustrates user plane protocol stacks between a UE and a P-GW in accordance with the Control Plane CIoT EPS optimization.

Referring to FIG. 8, GTP-u is a protocol which tunnels user data between the MME and S-GW as well as between the S-GW and P-GW in the backbone network. GTP encapsulates all end user IP packets. UDP/IP are the backbone network protocols used for routing user data and control signaling. NAS is the non-access stratum layer used to carry data between the UE and MME and may include header compression and security functions for user plane IP data.

The CIoT network or technology mainly provides communication services optimized for the IoT UE in terms of the core network, and the NB-IoT (narrowband Internet of Thing) network or technology optimizes the radio interface of the existing LTE technology for IoT.

As its name implies, the NB-IoT is a wireless technology that provides IoT services using a narrowband frequency of about 200 kHz. Compared to the conventional LTE technology using the minimum frequency band of about 1.25 MHz, the NB-IoT uses a very small frequency band. Therefore, the NB-IoT minimizes the processing power and power consumption of the UE.

The CIoT is a technology that minimizes the power consumption of the UE through the C-plane solution (that is, data is processed by the MME) or the U-plane solution (that is, even if the UE is in the RRC_IDLE state or a similar state, the UE and eNB maintains the context and use the context for the next connection in order to prevent the power consumption issue of the UE, which is caused because a number of messages are exchanged during the conventional attach or service request procedure.

Therefore, the NB-IoT radio technology and CIoT technology can be applied separately. That is, even if the NB-IoT radio technology is not used, it is possible to apply the CIoT technology through the conventional LTE radio network. This means that the CIoT technology can be applied to UEs that cannot use the NB-IoT radio technology, for example, UEs already released with the LTE radio technology only. In addition, it means that conventional LTE radio technology based cells can support conventional LTE UEs such as smart phones while simultaneously supporting IoT UEs.

The S1 mode means that the UE uses the S1 interface between the radio access network and core network. In the S1 mode, the UE accesses network services via the E-UTRAN. In the multi-access system, the S1 mode is divided into the WB-S1 mode and the NB-S1 mode according to the current radio access network.

In the multi-access system, if the current serving E-UTRA provides the S1 mode in accordance with the NB-IoT, the system is considered to operate in the NB-S1 mode (see 3GPP TS 24.301, 3GPP TS 36.300, 3GPP TS 36.331, and 3GPP TS 36.306). In addition, in the multi-access system, if the system operates in the S1 mode rather than the NB-S1 mode, the system is considered to operate in the WB-S1 mode. In other words, the CIoT mode includes the WB-S1 and NB-S1 modes, and the NB-IoT corresponds to the NB-S1 mode. Except the NB-IoT, the rest of the CIoT except including the conventional LTE may correspond to the WB-S1 mode.

When new traffic occurs, a UE in the idle state performs a service request procedure to transition to the active state capable of transmitting/receiving traffic. If the UE has traffic to be transmitted or the network has traffic to be transmitted to the UE in a state in which the UE is registered in the network but the S1 connection is released due to traffic deactivation, that is, when the UE is in the EMM-Registered state but in the ECM-Idle state, the UE send the service request to the network. Upon successfully completing the service request process, the UE transitions to the ECM-Connected state and configures the ECM connection (RRC connection+S1 signaling connection) on the control plane and E-RAB (DRB and an S1 bearer) on the user plane. Thereafter, the UE transmits/receives traffic. If the network desires to send traffic to a UE in the ECM-Idle state, the network informs the UE, through a paging message, that there is traffic to be transmitted so that the UE can send the service request. Details of the network-triggered service request procedure can be found in section 5.3.4.3 of 3GPP TS 23.401.

When a UE has traffic to be transmitted, the UE send the RRC connection request to the eNB through the random access procedure including steps 1) to 3) of FIG. 7. If the eNB accepts the RRC connection request from the UE, the eNB transmit the RRC connection setup message. After receiving the RRC connection setup message, the UE transmits the RRC connection setup complete message to the eNB by including the service request in the message. Details of the UE-triggered service request procedure can be found in section 5.3.4.1 of 3GPP TS 23.401.

Figure 9:
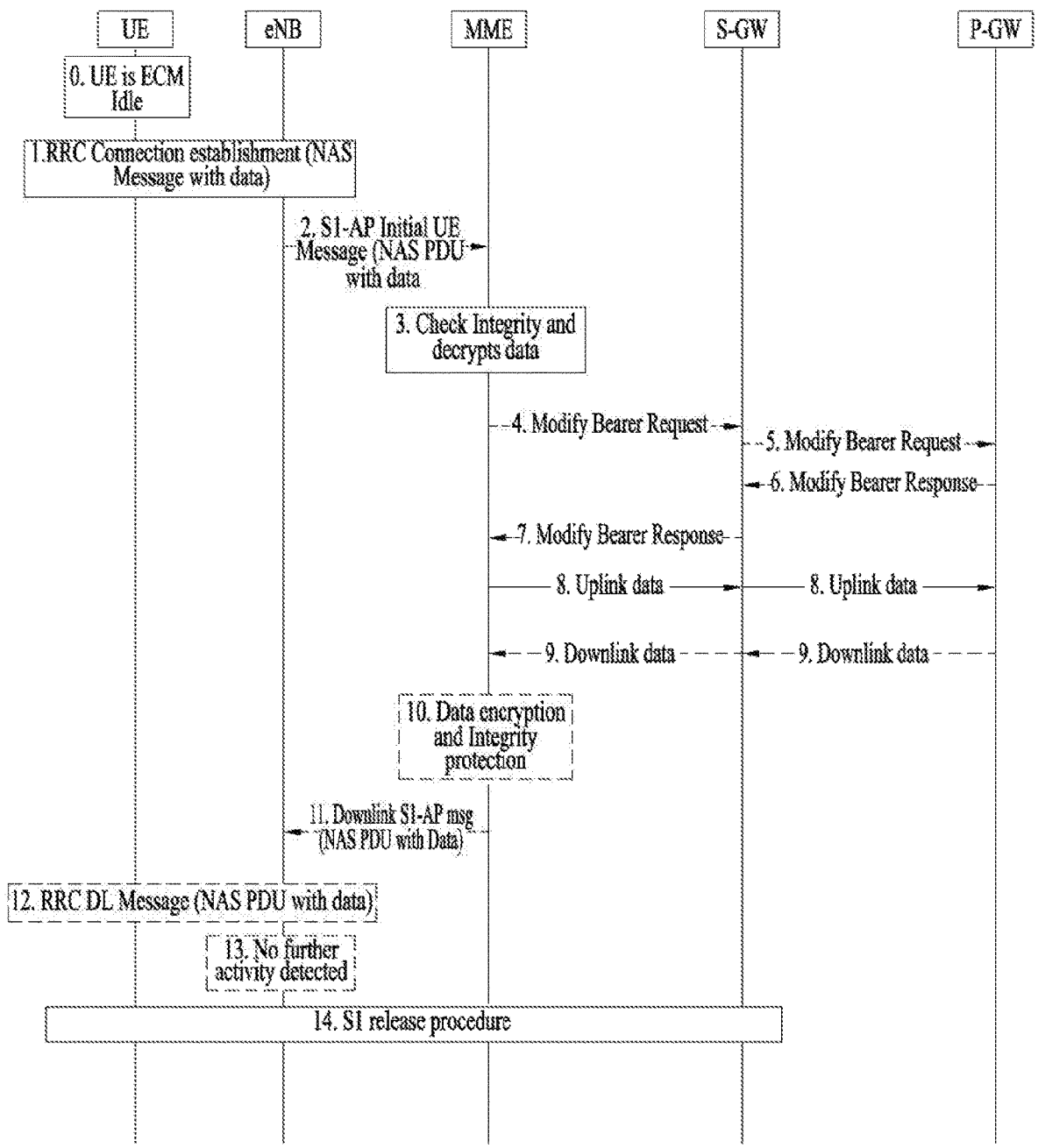
FIG. 9 illustrates a mobile originated data transport procedure in accordance with the Control Plane CIoT EPS optimization.

FIG. 9 shows a mobile originated data transfer procedure in the Control Plane CIoT EPS optimization.

>0. The UE is ECM-IDLE.

>1. The UE establishes a RRC connection and sends as part of it Uplink Data encrypted and integrity protected in a NAS message. The UE can also indicate a Release Assistance Information in the NAS message about whether Downlink data transmission (e.g. Acknowledgements or responses to UL data) subsequent to the Uplink Data transmission is expected or not. The UE may also indicate whether the S1 connection has to be released when DL data is received.

>2. The NAS message sent in in step 1 is relayed to the MME by the eNB using a S1-AP Initial UE message.

>3. The MME checks the integrity of the incoming NAS message PDU and decrypts the data it contains. The MME also decides at this stage whether the data transfer will use the SGi or SCEF-based delivery.

>4. If the S11-U connection is not established, the MME sends a Modify Bearer Request message (MME address, MME TEID DL, Delay Downlink Packet Notification Request, RAT Type) to the S-GW. The S-GW is now able to transmit downlink data towards the UE. If the PDN GW requested UE's location and/or User CSG information and the UE's location and/or User CSG information has changed, the MME shall send the Modify Bearer Request message and also include the User Location Information IE and/or User CSG Information IE in this message. If the Serving Network IE has changed compared to the last reported Serving Network IE then the MME shall send the Modify Bearer Request message and also include the Serving Network IE in this message. If the UE Time Zone has changed compared to the last reported UE Time Zone then the MME shall send the Modify Bearer Request message and include the UE Time Zone IE in this message.

>5. If the RAT Type has changed compared to the last reported RAT Type or if the UE's Location and/or Info IEs and/or UE Time Zone and Serving Network id are present in step 4, the S-GW shall send the Modify Bearer Request message (RAT Type) to the PDN GW. User Location Information IE and/or User CSG Information IE and/or Serving Network IE and/or UE Time Zone are also included if they are present in step 4.

If the Modify Bearer Request message is not sent because of above reasons and the PDN GW charging is paused, then the S-GW shall send a Modify Bearer Request message with PDN Charging Pause Stop Indication to inform the PDN GW that the charging is no longer paused. Other IEs are not included in this message.

>6. The PDN GW sends the Modify Bearer Response to the S-GW.

>7. If a Modify Bearer Request message was sent at step 4 the S-GW shall return a Modify Bearer Response (S-GW address and TEID for uplink traffic) to the MME as a response to a Modify Bearer Request message.

>8. The MME sends Uplink data to the P-GW via the S-GW.

>9. If no Downlink Data are expected based on the Release Assistance Information from the UE in step 1, the MME immediately releases the connection and therefore step 14 is executed. Otherwise, Downlink data may arrive at the P-GW and the P-GW sends them to the MME via the S-GW. If no data is received steps 11-13 are skipped. While the RRC connection is active, the UE may still send Uplink data in NAS PDUs that are carried in a S1AP Uplink message (not shown in FIG. 10). At any time the UE may provide Release Assistance Information with the Uplink data.

>10. If Downlink data are received in step 9, the MME encrypts and integrity protects the Downlink data.

>11. If step 10 is executed then Downlink data are encapsulated in a NAS PDU and sent to the eNB in a S1-AP Downlink Message. If the Release Assistance Information was received with Uplink data and it indicated a request to release the RRC connection upon Downlink data reception, the MME also includes in the S1-AP message an indication that the eNB shall release the RRC connection after successfully sending data to the UE.

The eNB sends a RRC Downlink data including the Downlink data encapsulated in NAS PDU. This may include a request to immediately release the RRC connection if in step 11 the S1-AP message included in the Release Assistance Information a request to tear down the RRC connection if Downlink data are received. If so step 14 is immediately executed.

>13. If no NAS activity exists for a while, the eNB starts an S1 release in step 14.

>14. The S1 release procedure is performed as described in section 5.3.5 of 3GPP TS 23.401.

If the UE is in EMM-IDLE mode and needs to transmit an initial NAS message, the UE may request the lower layer to establish an RRC connection. Initial NAS message may include: ATTACH REQUEST; DETACH REQUEST; TRACKING AREA UPDATE REQUEST; SERVICE REQUEST; and EXTENDED SERVICE REQUEST. The SERVICE REQUEST message is sent by the UE to the network to request the establishment of a NAS signaling connection and radio and S1 bearers. The EXTENDED SERVICE REQUEST message is sent by the UE to the network to initiate a CS fallback or 1×CS fallback call or respond to a mobile terminated CS fallback or 1×CS fallback request from the network; or to request the establishment of a NAS signaling connection and the radio and S1 bearers for packet services if the UE needs to provide additional information that cannot be provided via the SERVICE REQUEST message.

For example, the NAS message in step 1 of FIG. 9 may correspond to the SERVICE REQUEST message, and it is encapsulated in the RRC CONNECTION SETUP COMPLETE message.

The purpose of the service request procedure is to transfer the EMM mode from EMM-IDLE to EMM-CONNECTED mode. If the UE is not using the Control Plane CIoT EPS optimization, which will be described later, the service request procedure also establishes the radio and S1 bearers when user data or signaling is sent. If the UE is using the Control Plane CIoT EPS optimization, the service request procedure may be used for UE-initiated transfer of CIoT data. The service request procedure is used in the following cases: when the network has downlink signaling pending; when the UE has uplink signaling pending; when the UE or the network has user data pending and the UE is in the EMM-IDLE mode; and when the UE in the EMM-IDLE or EMM-CONNECTED mode has requested to perform mobile originating/terminating CS fallback or 1×CS fallback. The service request procedure is initiated by the UE, but for the downlink transfer of signaling, cdma2000® signaling or the EMM-IDLE mode, the trigger is given by the network by means of the paging procedure.

The UE may invoke the service request procedure in the following cases:

a) when the UE in the EMM-IDLE mode receives a paging request with CN domain indicator set to "PS" from the network;

b) when the UE in the EMM-IDLE mode has pending user data to be sent;

c) when the UE in the EMM-IDLE mode has uplink signaling pending;

d) when the UE in the EMM-IDLE or EMM-CONNECTED mode is configured to use CS fallback and has a mobile originating CS fallback request from the upper layer;

e) when the UE in the EMM-IDLE mode is configured to use CS fallback and receives a paging request with CN domain indicator set to "CS" or the UE in the EMM-CONNECTED mode is configured to use CS fallback and receives a CS SERVICE NOTIFICATION message;

f) when the UE in the EMM-IDLE or EMM-CONNECTED mode is configured to use 1×CS fallback and has a mobile originating 1×CS fallback request from the upper layer;

g) when the UE in the EMM-CONNECTED mode is configured to use 1×CS fallback and accepts cdma2000® signaling messages containing a 1×CS paging request received over E-UTRAN;

h) when the UE in the EMM-IDLE mode has uplink cdma2000® signalling pending to be transmitted over E-UTRAN;

i) when the UE in the EMM-IDLE or EMM-CONNECTED mode is configured to use 1×CS fallback, accepts cdma2000® signaling messages containing a 1×CS paging request received over cdma2000® 1×RTT and the network supports dual Rx CSFB or provides CS fallback registration parameters (see 3GPP TS 36.331);

j) when the UE in the EMM-IDLE or EMM-CONNECTED mode has uplink cdma2000® signaling pending to be transmitted over cdma2000® 1×RTT and the network supports dual Rx CSFB or provides CS fallback registration parameters (see 3GPP TS 36.331);

k) when the UE performs an inter-system change from S101 mode to S1 mode and has user data pending; or l) when the UE in the EMM-IDLE mode has to request resources for ProSe direct discovery or Prose direct communication.

During the EPS attach procedure (that is, when the UE requests PDN connectivity), the network activates a default EPS bearer context. In addition, the network can activate one or several dedicated EPS bearer contexts in parallel for IP PDN type PDN connections. To this end, the EPS session management message for the default EPS bearer context activation may be transmitted in an information element in the EPS mobility management message. In this case, the UE and the network execute the attach procedure, the default EPS bearer context activation procedure, and the dedicated EPS bearer context activation procedure in parallel. The UE and network should complete the combined default EPS bearer context activation procedure and the attach procedure before the dedicated EPS bearer context activation procedure is completed. If the UE or MME does not support the EMM-REGISTERED state with no PDN connection, the success of the attach procedure is dependent on the success of the default EPS bearer context activation procedure. If the attach procedure fails, then the ESM procedure also fails.

For example, EMM messages include the following types: attach accept; attach reject; attach reject; attach request; authentication failure; authentication reject; authentication request; authentication response; CS service notification; detach accept; detach reject; downlink NAS transport; EMM information; EMM status; extended service request; service request; service reject; tracking area update accept; tracking area update complete; tracking area update reject; tacking area update request; uplink NAS transport; downlink generic NAS transport; and uplink NAS transport.

For example, ESM messages include the following messages: activate dedicated EPS bearer context accept; activate dedicated EPS bearer context reject; activate dedicated EPS bearer context request; activate default EPS bearer context accept; activate default EPS bearer context reject; activate default EPS bearer context request; bearer resource allocation reject; bearer resource allocation request; bearer resource modification reject; bearer resource modification request; deactivate EPS bearer context request; deactivate EPS bearer context accept; ESM information request; ESM information response; and ESM status. Details of the currently defined EMM and ESM messages can be found in 3GPP TS 24.301 V13.4.0.

Regarding NAS messages for implementing mobile originated data transport in the Control Plane EPS optimization, the following two proposals are considered. Specifically, proposal 1 proposes to use a new NAS message, and proposal 2 proposes to modify and use an existing EXTENDED SERVICE REQUEST message. Hereinafter, small data transfer methods according to proposals 1 and 2 will be described.

Proposal 1

1. Method for transmitting small data in EMM-IDLE state: If it is requested to send the data via the control plane, the UE may send the DATA SERVICE REQUEST message comprising an ESM DATA TRANSPORT message contained in the ESM message container information element (IE).

2. Method for transmitting small data in EMM-CONNECTED state: Upon receiving a request to transfer user data via the control plane, if the UE is in the EMM-CONNECTED mode, the ESM entity in the UE initiates the mobile originated data transport procedure via the control plane by sending the ESM DATA TRANSPORT message including the data to be sent via the control plane container IE.

Proposal 2

1. Method for transmitting small data in EMM-IDLE state: If the UE is in the EMM-IDLE mode, the UE initiates CIoT data transfer by sending the EXTENDED SERVICE REQUEST message with the service type set to "mobile originating CIoT data transfer". The corresponding EXTENDED SERVICE REQUEST message is transmitted including a CIoT data message container.

2. Method for transmitting small data in EMM-CONNECTED state: In the case of UE-initiated generic transport of CIoT data, if there is a request for sending the CIoT data via the MME, the EMM entity of the UE initiates the mobile originated data transport procedure by including the CIoT data message container in the generic message container IE and sending an UPLINK GENERIC NAS TRANSPORT message with the generic message container type set to "CIoT data message container".

The purpose of the ESM message container IE is to enable piggyback transfer of a single ESM message in the EMM message. Proposals 1 and 2 are the same in that in the EMM-IDLE mode, EMM messages are transmitted and message containers are included in the corresponding EMM messages. However, messages, which carry data, in the message containers are different in the two proposals. In proposal 1, a new ESM message (e.g., ESM DATA TRANSPORT message) is included in the message container, but in proposal 2, an existing EMM message (e.g., UPLINK GENERIC NAS TRANSPORT message) is reused. In other words, according to proposal 2, the existing ESM message is included instead of the new ESM message.

In each of proposals 1 and 2, the UE in the EMM-IDLE mode performs an EMM procedure ((data) service request procedure) to transmit the EMM message including small data. In each of proposals 1 and 2, whether the corresponding EMM procedure is successfully performed, that is, whether the EMM message is successfully transmitted is determined as follows.

Proposal 1

If the RRC connection is successfully established, the UE determines that the service request procedure has been successfully completed and enters the EMM-CONNECTED mode.

Proposal 2

UE i) To transfer CIoT data, if the lower layer indicates that the EXTENDED SERVICE REQUEST message has been successfully transmitted, it is considered that the EMM procedure has been completed by the UE.

ii) Once the EXTENDED SERVICE REQUEST message is transmitted, the UE considers that the service request procedure has been successfully completed. Thereafter, the UE enters an EMM-SERVICE-REQUEST-INITIATED state.

Network

For case b among cases where the UE activates the service request procedure, if the UE is attached for EPS services with the CP-CIoT EPS optimization (that is, if the UE is using the CP-CIoT EPS optimization services), the UE initiates CIoT data transfer by sending the EXTENDED SERVICE REQUEST message with the service type set to "mobile originating CIoT data transfer". When the network receives the EXTENDED SERVICE REQUEST message, the UE considers that the service request is successfully completed.

In both proposals 1 and 2, the UE determines the success of the service request procedure based on the conditions of lower layers (e.g., AS layer). For example, in proposal 1, if the RRC connection is successfully established, it is determined that the EMM procedure is successful. On the other hand, in proposal 2, if the AS layer (e.g., RRC layer), which is one of the lower layers, indicates that the NAS message (e.g., EXTENDED SERVICE REQUEST message) is successfully transmitted, it is determined that the EMM procedure is successfully performed.

In some cases, data has been transmitted together with a NAS (EMM) message even in the conventional system. For example, the UPLINK GENERIC NAS TRANSPORT message is an EMM message and used to transfer data such as a location service (LCS), and the UPLINK NAS TRANSPORT message is used to transmit an SMS. However, theses EMM messages can be sent only when the UE is in the EMM-CONNECTED state. Specifically, a timer for checking whether a corresponding NAS (EMM) message is successfully transmitted does not have to be considered and a case where the MME rejects the corresponding NAS message has not been considered. Since the existing UPLINK GENERIC NAS TRANSPORT message and UPLINK NAS TRANSPORT message are transmitted in the EMM-CONNECTED state (although a NAS message for indicating ACK/NACK is required in the EMM-IDLE state), ACK/NACK for data included in the UPLINK GENERIC NAS TRANSPORT message and UPLINK NAS TRANSPORT message can be naturally transmitted/received.

However, in proposals 1 and 2 related to the Control Plane optimization, an EMM message contains small data and is similar to the existing UPLINK GENERIC NAS TRANSPORT message. However, the EMM message is different from the existing UPLINK GENERIC NAS TRANSPORT message in that it has the features of the initial NAS message such as ATTACH, TRACKING AREA UPDATE, SERVICE REQUEST. Due to this difference, in some cases, the MME should reject the corresponding EMM message. For example, there may occur a case where the MME should reject the service request by the EMM message.

If the MME accepts the EMM message for the Control Plane optimization instead of rejecting it, it means that the network does not perform procedures for checking UEs and the services which the UEs are registered in. In this case, if a network problem such as congestion occurs, there is no means of solving such a problem. In addition, if these UEs coexist with other legacy UEs, the legacy UEs may experience reverse discrimination.

According to the current discussion, after the UE using the Control Plane optimization transmits small data, the network does not determine whether the small data is received. Thus, it is the best way that the UE performs transmission without any error via a radio interface. If the UE correctly transmits small data in the radio interface, the UE can consider that the transmission of the small data is successful.

In summary, for the Control Plane optimization, that is, Control Plane CIoT EPS optimization, the EMM message mentioned in both proposals 1 and 2 has the two objects: mobility management and small data transfer. According to proposal 1, when the RRC connection is successfully established, the UE determines that a corresponding EMM procedure has been successfully completed. On the other hand, according to proposal 2, when the lower layer (e.g., RRC layer) indicates that the EXTENDED SERVICE REQUEST (e.g., EXTENDED SERVICE REQUEST message) has been successfully transmitted, the UE determines that the corresponding EMM procedure has been successfully completed. However, even though the corresponding EMM message is successfully transmitted from the lower layer (e.g., RRC layer), the eNB may fail to transfer it to the MME. Further, even when the MME successfully receives the EMM message, the MME may reject the corresponding EMM message or not respond due to its own problem. In other words, in both proposals 1 and 2, since the EMM message with small data is considered only in terms of the small data, the success or failure of the EMM message (except the small data), that is, the EMM procedure based on the EMM message is not separately considered only if it is checked that the EMM message with the small data has been successfully transmitted from the RRC layer. In addition, since small data is less important or has lower requirements in terms of transfer speed than normal data due to its characteristics, the necessity of loss detection during transmission or retransmission is relatively low. When the small data is missing, it may be retransmitted according to the method of the application layer. The 3GPP system has not defined a separate mechanism for small data. Moreover, since when the Control Plane CIoT EPS optimization, where small data is transmitted, is designed, the minimization of power consumption required for transmitting the small data has the first priority, a method for retransmitting lost packets has not been considered due to the necessity of a simple transmission method. Therefore, it has been discussed in both proposals 1 and 2 that the best way is to check at the RRC layer whether the small data is correctly transmitted. In other words, in both proposals 1 and 2, the success of the EMM procedure is determined based on only the small data transfer regardless of whether the EMM message is successfully transmitted. From the perspective of the UE, since even if the network (e.g., MME) accepts the EMM message after the UE transmits the EMM message in the EMM-IDLE state, the MME sends no response for the EMM message to the UE, the UE cannot determine whether the EMM message is correctly delivered to the network. In particular, when the UE transmits multiple NAS PDUs, if the UE transmits an initial NAS message (that is, EMM message) and the lower layer indicates that the initial NAS message is successfully transmitted, the UE determines that the initial NAS message is successfully delivered to the MME and the MME accepts the initial NAS message. Thereafter, the UE enters the EMM-CONNECTED state. In this case, according to the prior art or proposals 1 and 2, among the multiple NAS PDUs, the second or later NAS messages correspond to new ESM messages or UPLINK GENERIC NAS TRANSPORT messages rather than initial NAS messages. However, if the initial NAS message is not successfully delivered to the MME or if, upon receiving the initial NAS message, the MME rejects it, the second NAS message may not be successfully delivered to the MME.

As described above, the EMM message used for the Control Plane optimization has the two objects: mobility management and small data transfer. In both proposals 1 and 2, the success of the EMM procedure is determined based on whether small data is successfully transferred without consideration of whether the EMM message is successfully transmitted. However, the success of the EMM procedure, which is initiated by the transmission of the EMM message, should be determined by considering both the two objects: mobility management and data transfer. In the prior art, when the service request procedure is successfully performed, the eNB performs the procedure for establishing a DRB (data radio bearer). And, if the DRB establishment procedure is successfully completed, the access stratum (AS) layer of the UE informs the NAS layer that the user plane bearer has been established. By doing so, the NAS layer of the UE recognizes that the service request procedure has been successfully performed. However, in the case of the Control Plane optimization, since the DRB is not setup, the UE (e.g., NAS layer of the UE) cannot determine whether the EMM message has been successfully delivered in the EMM-IDLE mode.

In inventions 1-1, 1-2, and 1-3, methods for determining whether the EMM message, which is transmitted together with the first NAS PDU, is successfully transmitted are described. Inventions 1-1, 1-2, and 1-3 can be applied together or independently. Hereinafter, the initial NAS message containing the first NAS PDU, which is transmitted from the UE, is referred to as an EMM REQUEST message in order to distinguish it from the EMM message transmitted from the network.

In inventions 1-1, 1-2, and 1-3, the INITIAL UE message containing the NAS PDU that includes data, that is, the EMM REQUEST message for the CIoT EPS optimization may correspond to the DATA SERVICE REQUEST message (see proposal 1) or the EXTENDED SERVICE REQUEST message (see proposal 2). The EMM REQUEST message according to the present invention can be called other names rather than the DATA SERVICE REQUEST message or EXTENDED SERVICE REQUEST message. In other words, the EMM REQUEST message may be the SERVICE REQUEST message transmitted from the UE to the network when the UE uses the Control Plane CIoT EPS optimization. When the EMM REQUEST message is the EXTENDED SERVICE REQUEST MESSAGE, timer T31xx may be timer T3417ext. In addition, in the following description, 'operation in which the MME accepts/rejects the INITIAL UE message' may be performed by the NAS layer of the MME.

In the following description, timers T31$ab$, T31$xx$, and T31$xy$ are EMM timers of the UE that initiates the EMM request. If the same functions and operations as described in the present invention are applied, the corresponding timers can be called as other names rather than T31*ab*, T31*xx*, and T31*xy*.

<Invention 1-1: When the Network Accepts an EMM REQUEST Message, the MME Transmits an ACCEPT Message.>

In the prior art, the EMM message for service acceptance has not been defined. Invention 1-1 proposes to introduce the EMM message for service acceptance in order to response the EMM request for data transfer in accordance with the Control Plane CIoT EPS optimization.

If the network accepts the EMM REQUEST message, the UE and MME can operate as follows.

When the UE (NAS layer) transmits the EMM REQUEST message, the UE (NAS layer) starts timer T31*ab* at the same time. When receiving the ACCEPT message (i.e., EMM message) before expiration of timer T31*ab*, the UE may consider that the EMM REQUEST message is successfully transmitted. When the UE fails to receive any response (e.g., ACCEPT or REJECT message) to the EMM REQUEST message, which was transmitted by the corresponding UE, from the network before the expiration of timer T31*ab* after starting timer 31*ab*, the UE retransmits the EMM message including the NAS PDU.

When the MME receives the EMM REQUEST message for the mobile originated data transport in the Control Plane CIoT EPS optimization from the UE in the EMM-IDLE state and accepts the EMM REQUEST message, the MME transmits the ACCEPT message (EMM message) in response to the EMM REQUEST message to the UE.

When receiving the ACCEPT message, the UE recognizes that the EMM REQUEST message has been successfully transmitted. That is, upon receiving the ACCEPT message, the UE considers/treats that the corresponding EMM procedure has been successfully completed. In this case, the UE switches its states to the EMM-CONNECTED state.

Invention 1-1 can be applied to all cases where the mobile originated data is transported in accordance with the Control Plane CIoT EPS optimization. Alternatively, invention 1-1 can be limitedly applied only when the UE transmits multiple NAS PDUs in accordance with the Control Plane CIoT EPS optimization. When invention 1-1 is applied in the case where the multiple NAS PDUs are transmitted, if the UE receives the ACCEPT message in response to the NAS message transmitted in the EMM-IDLE mode, the UE recognizes that the current mode is the EMM-CONNECTED mode, that is, the UE considers that its current mode switches to the EMM-CONNECTED mode. After operating in the EMM-CONNECTED mode, that is, after receiving the ACCEPT message, the UE may transmit the second NAS message. A method for transmitting the second and later NAS messages will be described in detail in the section of <The method for transmitting second and later NAS PDUs when multiple NAS PDUs are transmitted>.

<Invention 1-2: when the Network Accepts an EMM REQUEST Message, the Network Transmits an ACCEPT Message Via S1AP and Radio Interfaces (that is, the Network Informs Acceptance of the EMM REQUEST Message Via S1-AP and RRC Messages).>

In invention 1-1, the ACCEPT message in response to the EMM REQUEST message is configured in the form of a NAS message, whereas in invention 1-2, the ACCEPT message in response to the EMM REQUEST message is configured in the form of S1-AP and RRC messages including acceptance indication.

In the Control Plane optimization, it is considered that when the MME receives an INITIAL UE message containing a NAS PDU that includes data and has no signaling or user data to send in downlink, the MME transmits a CONNECTION ESTABLISHMENT INDICATION message to the eNB. In this case, the MME allocates a unique MME UE S1AP ID to be used for the UE and includes the ID in the CONNECTION ESTABLISHMENT INDICATION message. Invention 1-2 is proposed based on such a connection establishment indication procedure.

Figure 10:
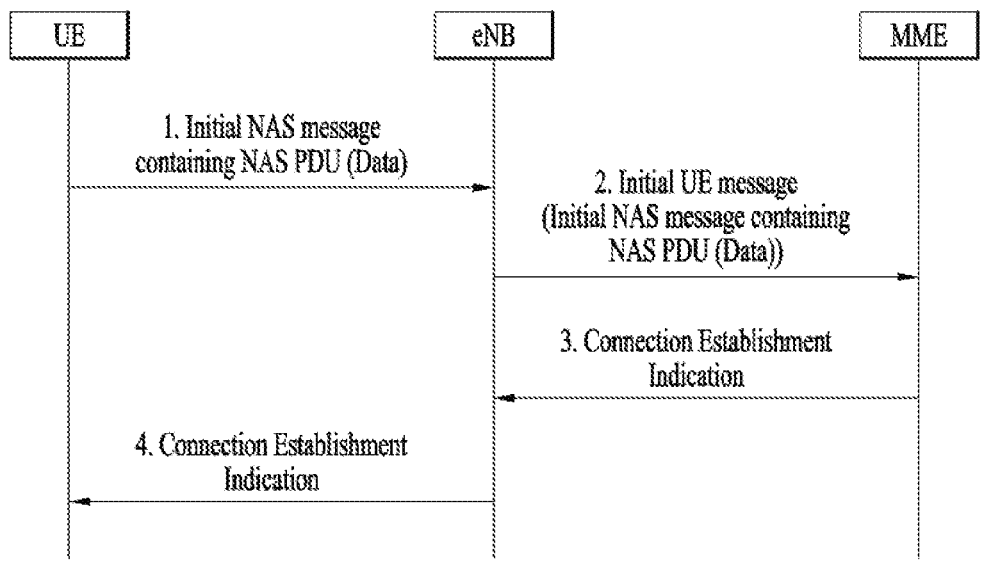
FIG. 10 illustrates a method according to the present invention in which the network node informs the UE that the EMM procedure is successful.

FIG. 10 illustrates a method according to the present invention in which the network informs the UE that the EMM procedure is successful. Specifically, FIG. 10 shows a method by which network nodes (MME and eNB) informs the UE of the success of the EMM procedure when the MME receives the INITIAL UE message containing the NAS PDU which includes data and has no signaling or user data to send in downlink.

Hereinafter, a method by which the UE determines the success of the EMM procedure when the network accepts the EMM request will be described with reference to FIG. 10.

>1. An INITIAL UE message including a NAS PDU that includes data is encapsulated in an RRC message, and then it is delivered to the eNB.

>2. The eNB forwards the INITIAL UE message including the NAS PDU that includes the data to the MME.

>3. When the MME receives the INITIAL UE message and has no downlink signaling or user data to transmit to the UE, the MME initiates the connection establishment indication procedure by sending the connection establishment indication to the eNB.

>4. Upon receiving the connection establishment indication from the MME, the eNB forwards the connection establishment indication to the UE.

In step 3, if the MME receives the INITIAL UE message and has downlink signaling or user data to transmit to the UE, the network node may inform the UE of the success of the EMM procedure according to invention 1-3, which will be described later.

Specifically, the eNB, MME, and UE may respectively operate as follows.

If the eNB receives the connection establishment indication from the MME in step 3 of FIG. 10, the eNB recognizes that the INITIAL UE message containing the NAS PDU that includes the data, which had been transmitted from the UE, was successfully delivered to the MME and the MME accepted the INITIAL UE message and then forwards the connection establishment indication to the UE in step 4 of FIG. 10. The RRC message used for transmitting the connection establishment indication may be an existing RRC message or a new RRC message which is defined for transmitting the connection establishment indication.

Upon receiving the connection establishment indication, the AS layer of the UE transmits an indication for connection establishment for the control plane to the higher layer (e.g., NAS layer). When receiving the indication for the connection establishment for the control plane, the NAS layer of the UE recognizes (determines or considers) that the INITIAL UE message containing the NAS PDU which includes the data, which had been transmitted in step 1 of FIG. 10, was successfully delivered to the MME and the MME accepted the initial NAS message. Thereafter, the NAS layer of the UE switches the current state to the EMM-CONNECTED state. If there is a NAS PDU including additional data to be transmitted, the NAS PDU may be transmitted in a NAS message. In this case, the NAS message is the NAS message transmitted in the EMM-CONNECTED state rather than the INITIAL UE message.

Figure 11:
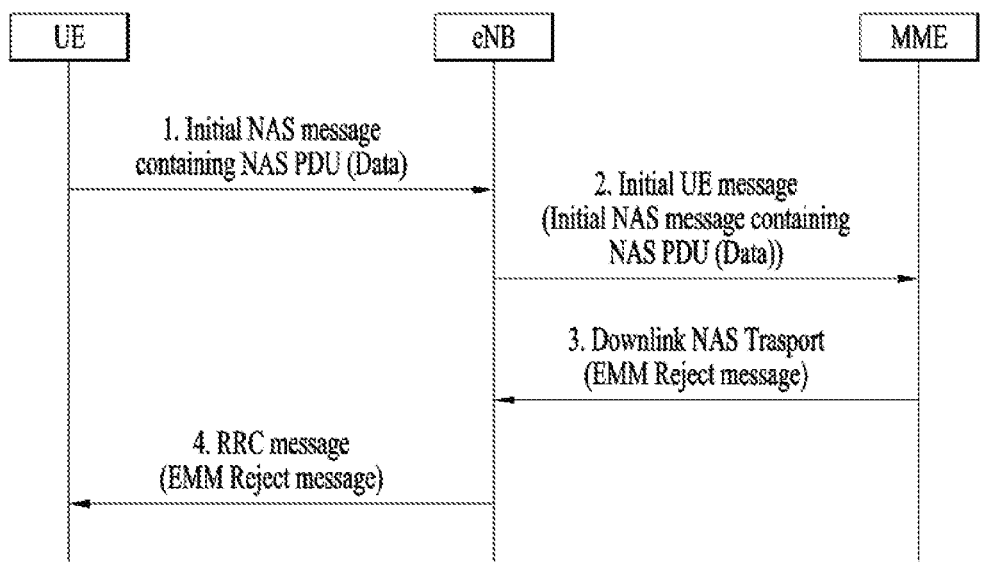
FIG. 11 illustrates a method by which the network node informs the UE that the EMM procedure is rejected.
Figure 12:
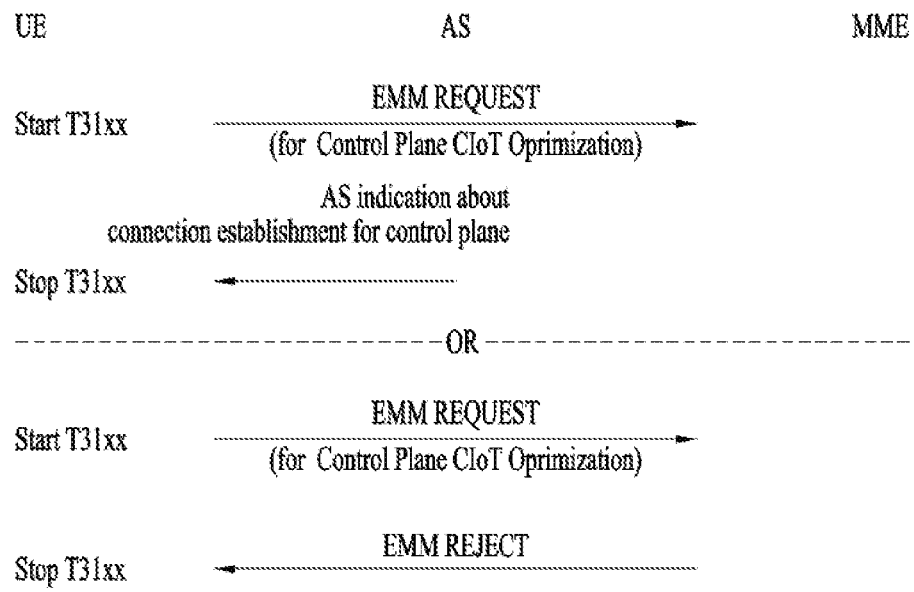
FIG. 12 illustrates the operation of the UE's NAS layer when the network accepts or rejects the EMM request.

FIG. 11 illustrates a method by which the network node informs the UE that the EMM procedure is rejected. Specifically, FIG. 11 shows how network nodes (MME and eNB) informs the UE of the failure of the EMM procedure when the network (e.g., MME) rejects the EMM request (e.g., service request for data transport in the Control Plane CIoT EPS optimization). FIG. 12 illustrates the operation of the UE's NAS layer when the network accepts or rejects the EMM request. Specifically, the upper figure of FIG. 12 shows a case where the network accepts the EMM request, and the lower figure of FIG. 12 shows a case where the network rejects the EMM request. In FIG. 12, AS means an access stratum.

With reference to FIG. 11 and the lower figure of FIG. 12, a method by which the UE determines whether the EMM procedure is successful when the network rejects the EMM request will be described.

>1. The UE transmits an INITIAL UE message including a NAS PDU that includes data, that is, an EMM REQUEST message for the Control Plane CIoT EPS optimization.

Referring to the lower figure of FIG. 12, when the EMM REQUEST message is transmitted, the NAS layer of the UE starts timer T31xx. When receiving, from the higher layer (i.e., AS layer), an indication for connection establishment for the control plane or downlink data before expiration of timer T31xx, the NAS layer of the UE stops timer T31xx and transitions to the EMM-CONNECTED state. When the UE receives an EMM REJECT message before the expiration of timer T31xx, the UE stops timer T31xx and operates based on a cause included in the EMM REJECT message (details can be found in section 8.2.24 "Service Reject" of 3GPP TS 24.301).

<Invention 1-3: A Method for Determining the Success or Failure of an EMM REQUEST Message with No ACCEPT Message>

Figure 13:
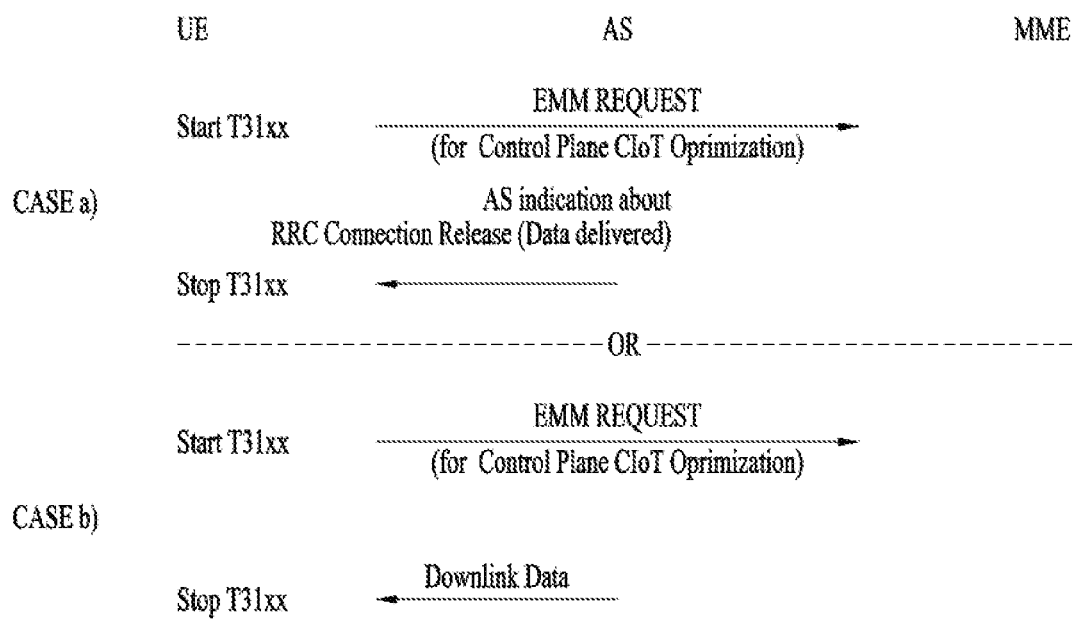
FIG. 13 illustrates another method according to the present invention in which the network node informs the UE that the EMM procedure is successful.

FIG. 13 illustrates another method according to the present invention in which the network node informs the UE that the EMM procedure is successful. Specifically, FIG. 13 shows another method by the network nodes (MME and eNB) informs the UE of the success of the EMM procedure when the MME receives the INITIAL UE message containing the NAS PDU which includes data and has no signaling or user data to send in downlink. Referring to FIG. 13, the NAS layer of the UE may know whether the EMM request is successful with no EMM ACCEPT message unlike FIG. 10. In FIG. 13, AS means an access stratum.

Hereinafter, a method for allowing the UE to indirectly determine the success or failure of an EMM request (message) without any ACCEPT messages transmitted from the network to the corresponding UE when the network (e.g., MME) accepts the EMM request (message) will be described. When there is no ACCEPT message in response to the EMM REQUEST message because no ACCEPT message is defined or the network transmits no ACCEPT message, the UE may determine whether its EMM REQUEST message is successfully delivered or not as follows.

Case a): When the UE transmits only a single NAS PDU and when there is no subsequent NAS PDU and no response (e.g., ACK/NACK) to the NAS PDU, if the UE receives, from the lower layer, an indication indicating that the RRC connection is released after transmitting the EMM REQUEST message, the UE determines that the EMM REQUEST message is successfully transmitted. That is, the UE considers/treats that the EMM procedure in accordance with the EMM REQUEST message is successfully completed.

Referring to case a) of FIG. 13, when transmitting the EMM REQUEST message, the UE (NAS layer) simultaneously starts timer T31xx. When receiving the indication indicating that the RRC connection is released before expiration of timer T31xx, the UE may consider that the EMM REQUEST message is successfully transmitted. If the UE fails to receive the indication indicating that the RRC connection is released or any response (e.g., rejection) from the network before the expiration of timer T31xx, the UE retransmits the EMM REQUEST message including a NAS PDU. In this case, if the operation, which will be described in the section of <The operation depending on whether the EMM message and small data are successfully transmitted>, is applied together, the NAS PDU may be the same as the previous NAS PDU or a new NAS PDU different from the previous NAS PDU according to whether the small data is successfully transmitted. If the operation which will be described in the section of <The operation depending on whether the EMM message and small data are successfully transmitted>, is not applied together, the UE cannot know whether the small data is successfully transmitted. Thus, the UE may transmit the same NAS PDU as the previously transmitted NAS PDU.

In case a) of FIG. 13, when the UE (NAS layer) receives a specific cause (for example, data is successfully delivered) together with the indication indicating that the RRC connection is released, the UE may consider that the EMM REQEUST message is successfully transmitted. The UE should distinguish between the RRC connection release and the conventional RRC connection release, which is triggered by the eNB when an inactivity timer expires (see steps 13 and 14 of FIG. 9). To this end, a specific release cause, for example, 'Data Delivered' may be used.

Case b): When there is a response (e.g., ACK/NACK) to the NAS PDU transmitted from the UE, for example, when the UE successfully receives downlink data (e.g., response to the NAS PDU) after transmitting the EMM REQUEST message, the UE determines that the transmission of the EMM REQUEST message is successful. That is, the UE considers/treats that the corresponding EMM procedure in accordance with the EMM REQUEST message is successfully completed. In this case, the UE enters the EMM-CONNECTED state.

Referring to case b) of FIG. 13, when transmitting the EMM REQUEST message, the UE (NAS layer) simultaneously starts timer T31xx. If the UE (NAS layer) successfully receives downlink data before expiration of timer T31xx, the UE (NAS layer) may consider that the EMM REQUEST message is successfully transmitted.

Here, the downlink data may be a response to uplink data or downlink data unrelated to uplink.

If the UE fails to receive downlink data, a response (e.g., ACK/NACK) to the uplink data transmitted in the EMM REQUEST message, or a response (e.g., rejection) to the EMM REQUEST message from the network before the expiration of timer T31xx, the UE retransmits the EMM REQUEST message including a NAS PDU. If downlink data corresponds to the response (ACK or NACK), which the UE (NAS layer) expects to receive in response to the NAS PDU transmitted in the EMM REQUEST message, the UE may consider that the EMM REQUEST message is successfully transmitted. In this case, the higher layer (e.g., application layer) of the UE may inform the NAS layer of the UE that the downlink data corresponds to the response (ACK or NACK) to the NAS PDU transmitted in the EMM REQUEST message.

The UE operation in accordance with invention 1-3 can be summarized as follows.

The UE transmits an INITIAL UE message containing a NAS PDU which includes data, i.e., an EMM message for the Control Plane CIoT optimization. The UE starts timer T31xx at the same time with transmission of the INITIAL UE message. If the lower layers (e.g., AS layer) indicate that the RRC connection is released before expiration of timer T31xx, the NAS layer of the UE recognizes/considers that the INITIAL UE message including the NAS PDU that contains the data has been successfully transmitted to the MME and the MME has accepted the INITIAL UE message. The RRC connection release indication may mean that the cause of the RRC connection release is set to a specific cause value (e.g., 'Data Delivered'). If the UE receives downlink data before the expiration of timer T31xx, the UE stops timer T31xx and transitions to the EMM-CONNECTED state.

<Invention 2: The EMM REQUEST Message is Always Transmitted.>

When the UE performs the mobile originated data transport in the Control Plane CIoT EPS optimization, the UE transmits the EMM message, which is an initial NAS message, (for example, the DATA SERVICE REQUEST message of proposal 1 or the modified EXTENDED SERVICE REQUEST message of proposal 2) (hereinafter referred to as the EMM REQUEST message) regardless of whether the current mode is either the EMM-IDLE mode or EMM-CONNECTED mode. That is, when multiple NAS PDUs are transmitted, all the NAS PDUs are transmitted in the EMM message (e.g., DATA SERVICE REQUEST message or modified EXTENDED SERVICE REQUEST message) which is an initial NAS message.

The NAS procedure of invention 2 can be applied independently from or together with inventions 1-1, 1-2, and/or 1-3.

When transmitting the EMM REQUEST message, the UE starts timer T31xy. Thereafter, when the UE receives, from the lower layer (e.g., AS layer), an indication indicating that the EMM REQUEST message has been successfully transmitted, if the UE receive no EMM REJECT message until expiration of timer T31xy, the UE may consider that the EMM REQUEST message has been successfully delivered to the MME and the MME has accepted the EMM REQUEST message. In this case, the UE may transmit the following EMM message.

If the UE receives the EMM REJECT message before the expiration of timer T31xy or fails to receive, from the lower layer, the indication indicating that the EMM REQUEST message has been successfully transmitted, the UE performs the operation, which will be described later in the section of <The transmission and retransmission of the EMM REQUEST message by the UE>.

In addition, timer T31xy may be limitedly applied when the first EMM REQUEST message is transmitted. That is, the second and later EMM (REQUEST) messages may be transmitted without any timer operation immediately after the previous EMM (REQUEST) message is transmitted.

<The Transmission and Retransmission of the EMM REQUEST Message by the UE>

When the UE transmits an EMM (REQUEST) message for the mobile originated data transport in the Control Plane CIoT EPS optimization in the EMM-IDLE state, the transmission and retransmission of the EMM (REQUEST) message is performed according to the conventional EMM message transmission method.

Here, the conventional EMM message transmission method means the UE operations including retransmission for all cases including: 1) when the UE fails to receive any response (acceptance or rejection) from the network although the UE transmits the EMM message and starts a specific timer in order to check whether the EMM message is successfully transmitted; 2) when the lower layer (e.g., AS layer) has a problem during transmission (e.g., higher layer failure or ACB (access class barring) occurs); and 3) when the MME rejects the message. The same method as that for the conventional initial NAS message (e.g., service request) is applied. If it is determined that the EMM message has not been successfully transmitted, the UE may retransmit the corresponding EMM message.

<The Success or Failure of Small Data Reception>

When the MME receives small data together with a NAS message (e.g., EMM message or ESM message), the MME may inform the UE of whether the NAS message is successfully received or not as follows.

The MME may inform whether the small data reception is successful by transmitting an IE or cause in a response (acceptance or rejection) message in response to the NAS message (e.g., EMM message or ESM message). The corresponding IE or cause may be a new IE or cause or an existing IE or cause.

The UE may recognize whether the small data has been successfully transferred, based on the IE and cause.

The IE or cause is defined and indicated to the UE only when the small data transfer fails. When the small data transfer succeeds, the MME may transmit a response message with no IE or cause. If the UE receives the response message without any IE or cause, which indicates the failure of the small data transfer, the UE determines that the small data transfer succeeds.

<The Operation Depending on Whether the EMM Message and Small Data are Successfully Transmitted>

The UE operates as follows depending on the success or failure of the request in the EMM message, that is, depending on whether the EMM procedure is successfully completed and whether the small data is successfully transmitted.

1. When the request in the EMM message, that is, the EMM request fails but the small data transfer succeeds, the UE performs the operation mentioned in the section of <The transmission and retransmission of the EMM REQUEST message by the UE>. Specifically, this case means that the UE receives a rejection message in response to the EMM REQUEST message and the small data transfer succeeds.

If the UE has more small data to transfer and needs to retransmit the EMM REQUEST message as described in the section of <The transmission and retransmission of the EMM REQUEST message by the UE>, the UE retransmits the EMM REQUEST message by including the corresponding small data in the message.

If the UE has no small data to transfer, the UE performs only the operation mentioned in the section of <The transmission and retransmission of the EMM REQUEST message by the UE> or no operation.

2. When the request in the EMM message, that is, the EMM request succeeds but the small data transfer fails, the UE performs transmission according to the 'small data transfer method in the EMM-CONNECTED state' described in proposal 1 or 2. When the EMM request succeeds but the small data transfer fails, the UE may receive an acceptance message in response to the EMM request and an IE or cause indicating that the small data transfer fails.

3. When both the request in the EMM message, that is, the EMM request and the small data transfer fail, if the EMM REQUEST message needs to be retransmitted as mentioned in the section of <The transmission and retransmission of the EMM REQUEST message by the UE>, the UE retransmits the EMM REQUEST message that contains the small data. When both the EMM request and small data transfer fail, the UE may receive the EMM REJECT message and the IE or cause indicating that the small data transfer fails. In addition, it may include a case where the lower layer (e.g., AS or RRC layer) fails to transmit the EMM message including the small data. When the lower layer fails to successfully send the EMM message including the small data, the lower layer may send an indication to the NAS layer. The UE may perform the conventional operation of transmitting or retransmitting the EMM message based on the cause of the transmission failure at the lower layer, that is, the cause why the lower layer fails to successfully transmit the EMM message including the small data.

<The Method for Transmitting the Second and Later NAS PDUs when Multiple NAS PDUs are Transmitted>

When multiple NAS PDUs are transmitted, the UE (or its NAS layer) transmits the first NAS PDU together with the EMM REQUEST message. Thereafter, the UE does not transmit NAS PDUs which occur after the first NAS PDU before determining that the EMM REQUEST message transmitted with the first NAS PDU is successfully delivered.

Until when the NAS layer determines that the EMM REQUEST message transmitted with the first NAS PDU is successfully delivered, the NAS PDUs which occur after the first NAS PDU are pending.

When it is determined that the EMM REQUEST message transmitted with the first NAS PDU has been successfully delivered, for the second or later NAS PDU(s), the UE (or NAS layer) immediately transmits the next NAS PDU regardless of whether the NAS message including the previous NAS PDU is successfully delivered.

The success of the EMM REQUEST message which is transmitted together with the first NAS PDU may be determined according to invention 1-1, 1-2, or 1-3.

In the case of the second or later NAS PDU(s), if the NAS layer receives, from the lower layer (e.g., AS layer or RRC layer) an indication indicating that the message including a corresponding NAS PDU is successfully transmitted, the NAS layer determines that the corresponding NAS PDU is successfully transmitted.

<The Combinations of the Invention Proposals>

Inventions 1-1 and 1-2 can be interpreted as follows:

Invention 1-1 means that when the MME accepts an INITIAL UE message (EMM REQUEST message), the MME transmits an ACCEPT message to the UE; and Invention 1-2 means that when the MME accepts an INITIAL UE message (EMM REQUEST message), the MME transmits a CONNECTION ESTABLISHMENT INDICATION message to the eNB, and the eNB forwards the CONNECTION ESTABLISHMENT INDICATION message to the UE.

Inventions 1-1 and 1-2 can be combined as follows.

Combination 1) Invention 1-1 or 1-2 may be applied when there is no downlink data (ACK or NACK) in response to uplink data (or when no downlink data is expected).

Combination 2) Invention 1-1 or 1-2 may be applied only when the UE transmits multiple NAS PDUs.

Combination 3) Invention 1-1 or 1-2 may be applied only when combinations 1 and 2 are satisfied. For example, when the UE transmits multiple NAS PDUs, if there is no downlink data (ACK or NACK) in response to uplink data included in the first NAS PDU among the multiple NAS PDUs, invention 1-1 or 1-2 may be applied.

Combination 4) combinations 1, 2, and 3 can be combined with invention 1-3 as follows.

In invention 1-3, when the UE receives an RRC connection release indication or downlink data, the UE considers the success of the EMM REQUEST message.

When invention 1-1 or 1-2 is used based on combination 1, among the methods of invention 1-3, the method when the UE receives downlink data can be used together if there is downlink data which is a downlink response (ACK or NACK).

When invention 1-1 or 1-2 is used based on combination 2, among the methods of invention 1-3, the method when the UE receives an RRC connection release indication can be used together if the UE transmits a single NAS PDU.

When invention 1-1 or 1-2 is used based on combination 3, if the UE transmits a single NAS PDU and there is no downlink data (ACK or NACK) in response to uplink data, among the methods of invention 1-3, the method when the UE receives an RRC connection release indication may be applied. If the UE transmits a single NAS PDU and there is downlink data (ACK or NACK) in response to uplink data, among the methods of invention 1-3, the method when the UE receives an RRC connection release indication or the method when the UE receives downlink data may be applied. If the UE transmits multiple NAS PDUs and there is downlink data (ACK or NACK) in response to uplink data (or when downlink data is expected), among the methods of invention 1-3, the method when the UE receives downlink data may be applied. For example, when there is downlink data (ACK or NACK) in response to uplink data included in the first NAS PDU, among the multiple NAS PDUs, the method when the UE receives downlink data among the methods of invention 1-3 may be applied.

<The Case in which the MME Sends an ACCEPT Message in Response to an EMM Message to the UE>

Although the MME receives an EMM message including small data via the control plane and accepts the EMM message, the MME does not transmit any ACCEPT message in response to the EMM message in the following cases. In other words, when the MME receives an EMM message including small data via the control plane and accepts the EMM message, the MME transmits an ACCEPT message in response to the EMM message except for the following cases.

Case 1. A case in which the EMM message including the small data received by the MME contains a release assistance notification value (or release assistance information). Here, the inclusion of the release assistance notification value (or release assistance information) may be interpreted to mean that at least one of the following information is included:

Information A. Downlink data transmission subsequent to uplink data transmission is not expected; and Information B. Downlink data transmission subsequent to the uplink data transmission is expected.

Information A means that when a single NAS PDU is transmitted, there is no downlink data (ACK or NACK) in response to uplink data, whereas information B means that when a single NAS PDU is transmitted, there is downlink data (ACK or NACK) in response to uplink data. In other words, information A and B respectively mean that the UE transmits only a single NAS PDU and subsequent NAS PDUs are not transmitted/received.

When the MME receives an EMM message including small data, if the EMM message includes no release assistance notification value (or release assistance information), the MME transmits an ACCEPT message in response to the EMM message including the small data to the corresponding UE.

Case 2. A case in which while the MME receives an EMM message including small data, the establishment of a user plane bearer is completed or started. The user plane bearer means an S1-U bearer or a data radio bear (DRB).

In summary, in case 1 or 2, if the MME receives an EMM message including small data via the control plane and accepts the EMM message, the MME transmits no ACCPET message to the UE. However, even in case 1 or 2, if the MME fails to receive small data included in the EMM message, the MME transmits an ACCEPT message to the UE in order to inform the UE of the failure of the small data reception. The method for indicating the failure in the small data reception has been described in the section of <The success or failure of small data reception>.

Figure 14:
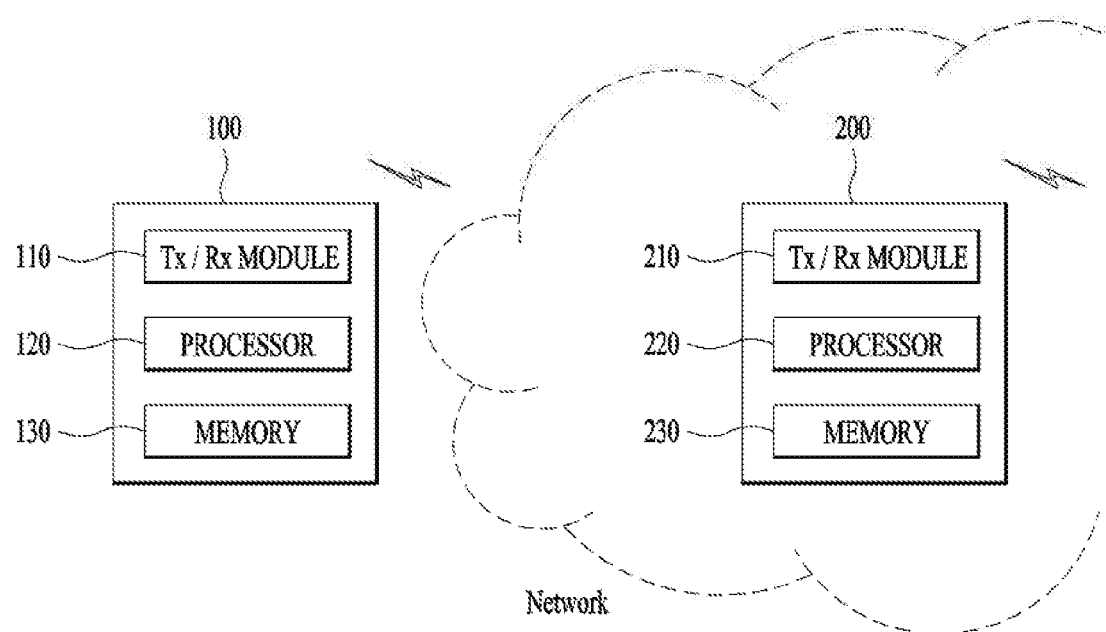
FIG. 14 illustrates a node according to an embodiment of the present invention.

FIG. 14 illustrates configuration of a UE and a network node according to a preferred embodiment of the present invention.

The UE 100 according to the present invention may include a transmitting/receiving (Tx/Rx) module 110, a processor 120, and a memory 130. The Tx/Rx module 110 of the UE 100 may be referred to as a radio frequency (RF) unit. The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the Tx/Rx module 110. The memory 130 may store the calculated and processed information for a predetermined time, and may be replaced by another constituent such as a buffer (not shown).

Referring to FIG. 14, the network node 200 according to the present invention may include a transmitting/receiving (Tx/Rx) module 210, a processor 220 and a memory 230. If the Tx/Rx module communicates with a UE 100, the Tx/Rx module 210 may be referred to as an RF unit. The Tx/Rx module 210 may be configured to transmit and receive various signals, data and information to and from an external device. The network node 200 may be connected to an external device by wire and/or wirelessly. The Tx/Rx module 210 may be embodied to be divided into a transmitter and a receiver. The processor 220 may control overall operation of the network node 200, and be configured to calculate and process information for the network node 200 to transmit and receive to and from the external device. In addition, the processor 220 may be configured to perform the proposed operations of the network node. According to the proposal of the present invention, the processor 220 may control the Tx/Rx module 210 to transmit data or a message to a UE or another network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method for transmitting a service request by a user equipment (UE) comprising an access stratum (AS) layer and a non-access stratum (NAS) layer in a wireless communication system, the method comprising:
   transmitting, by the NAS layer, a SERVICE REQUEST message,
   wherein based on that the UE is configured to use control plane cellular internet of things (CIoT) optimization, the SERVICE REQUEST message comprises uplink user data to be transmitted via a control plane; and
   determining, by the NAS layer of the UE, that a service request procedure related to the SERVICE REQUEST message is successfully completed, based on that the NAS layer of the UE obtains, from the AS layer, an indication regarding a radio resource control (RRC) connection release after the transmission of the SERVICE REQUEST message,
   wherein the SERVICE REQUEST message is a non-access stratum (NAS) message.

2. The method of claim 1, further comprising:
   determining, by the NAS layer of the UE, that the service request procedure related to the SERVICE REQUEST message is successfully completed, based on that (ii) downlink data is received after the transmission of the SERVICE REQUEST message, and
   determining, by the NAS layer of the UE, that the service request procedure related to the SERVICE REQUEST message is successfully completed, based on that (iii) SERVICE ACCEPT message is received after the transmission of the SERVICE REQUEST message.

3. The method of claim 2,
wherein the downlink data is received via the control plane.

4. The method of claim 1, further comprising:
starting a specific timer at the same time as the transmission of the SERVICE REQUEST message is started,
wherein it is determined that the service request procedure related to the SERVICE REQUEST message is successfully completed based on that the at least one of predetermined conditions is met before expiration of the specific timer.

5. The method of claim 1, wherein the indication regarding the RRC connection release being obtained from a lower layer.

6. The method of claim 1, wherein a RRC connection between the UE and a base station is released in response to the indication regarding the RRC connection release.

7. A method for by a network node in a wireless communication system, the method comprising:
receiving, from a user equipment (UE) which includes an access stratum (AS) layer and a non-access stratum (NAS) layer, a SERVICE REQUEST message,
wherein based on that the UE is configured to use control plane cellular internet of things (CIoT) optimization, the SERVICE REQUEST message comprises uplink user data to be transceived via a control plane,
performing a service request procedure related to the SERVICE REQUEST message wherein the service request procedure is successfully completed in association with a radio resource control (RRC) connection release after the reception of the service request message,
wherein the SERVICE REQUEST message is a non-access stratum (NAS) message.

8. The method of claim 7,
wherein the service request procedure is successfully completed in association with (ii) transmitting, to the UE, downlink data after the reception of the service request message, and
wherein the service request procedure is successfully completed in association with (iii) transmitting, to the UE, a SERVICE ACCEPT message after the reception of the service request message.

9. The method of claim 8,
wherein the downlink data is transmitted via the control plane.

10. The method of claim 5,
wherein the network node is a mobility management entity (MME).

11. A user equipment (UE) in a wireless communication system, the UE comprising:
a memory, and
at least one processor operating an access stratum (AS) layer and a non-access stratum (NAS) layer and coupled with the memory,
wherein the at least one processor is configured to:
operate the NAS layer to transmit a SERVICE REQUEST message
wherein based on that the UE is configured to use control plane cellular internet of things (CIoT) optimization, the SERVICE REQUEST message comprises uplink user data to be transmitted via a control plane,
operate the NAS layer to determine that a service request procedure related to the SERVICE REQUEST message is successfully completed, based on that the NAS layer of the UE obtains, from the AS layer, an indication regarding a radio resource control (RRC) connection release after the transmission of the SERVICE REQUEST message,
wherein the SERVICE REQUEST message is a non-access stratum (NAS) message.

12. The UE of claim 11,
wherein the processor is further configured to:
operate the NAS layer to determine that the service request procedure related to the SERVICE REQUEST message is successfully completed, based on that (ii) downlink data is received after the transmission of the service request message, and
operate the NAS layer to determine that the service request procedure related to the SERVICE REQUEST message is successfully completed, based on that (iii) a SERVICE ACCEPT message is received after the transmission of the service request message.

13. The UE of claim 12,
wherein the downlink data is received via the control plane.

14. The UE of claim 11,
wherein the processor is further configured to start a specific timer at the same time as the transmission of the SERVICE REQUEST message is started,
wherein it is determined that the service request procedure related to the SERVICE REQUEST message is successfully completed based on that the at least one of predetermined conditions is met before expiration of the specific timer.

15. A network node in a wireless communication system, the network node comprising:
a memory, and
at least one processor coupled with the memory,
wherein the at least one processor is configured to:
receive, from a user equipment (UE) which includes an access stratum (AS) layer and a non-access stratum (NAS) layer, a SERVICE REQUEST message,
wherein based on that the UE is configured to use control plane cellular internet of things (CIoT) optimization, the SERVICE REQUEST message comprises uplink user data to be transceived via a control plane,
perform a service request procedure related to the SERVICE REQUEST message wherein the service request procedure is successfully completed in association with a radio resource control (RRC) connection release after the reception of the service request message,
wherein the SERVICE REQUEST message is a non-access stratum (NAS) message.

16. The network node of claim 15,
wherein the service request procedure is successfully completed in association with (ii) transmitting, to the UE, downlink data after the reception of the service request message, and
wherein the service request procedure is successfully completed in association with (iii) transmitting, to the UE, a SERVICE ACCEPT message after the reception of the service request message.

17. The network node of claim 16,
wherein the downlink data is transmitted via the control plane.

18. The network node of claim 15,
wherein the network node is a mobility management entity (MME).

* * * * *